US007372776B2

(12) United States Patent
Butler et al.

(10) Patent No.: US 7,372,776 B2
(45) Date of Patent: May 13, 2008

(54) MODAL ACOUSTIC ARRAY TRANSDUCTION APPARATUS

(75) Inventors: Alexander L. Butler, Weymouth, MA (US); John L. Butler, Cohasset, MA (US)

(73) Assignee: Image Acoustics, Inc., Cohasset, MA (US)

( * ) Notice: Subject to any disclaimer, the term of this patent is extended or adjusted under 35 U.S.C. 154(b) by 125 days.

(21) Appl. No.: 11/360,361

(22) Filed: Feb. 23, 2006

(65) Prior Publication Data

US 2007/0195647 A1 Aug. 23, 2007

(51) Int. Cl.
*G01K 11/00* (2006.01)

(52) U.S. Cl. ........................................ 367/138

(58) Field of Classification Search ................ 367/138, 367/164, 153; 310/334, 369, 366
See application file for complete search history.

(56) References Cited

U.S. PATENT DOCUMENTS

| | | | | |
|---|---|---|---|---|
| 3,290,646 | A | 12/1966 | Ehrlich et al. | |
| 3,378,814 | A | 4/1968 | Butler | |
| 3,732,535 | A | 5/1973 | Ehrlich | |
| 3,821,740 | A * | 6/1974 | Ehrlich | 367/126 |
| 3,845,333 | A | 10/1974 | Holloway | |
| 3,924,259 | A | 12/1975 | Butler et al. | |
| 4,326,275 | A | 4/1982 | Butler | |
| 4,438,509 | A | 3/1984 | Butler et al. | |
| 4,443,731 | A | 4/1984 | Butler et al. | |
| 4,642,802 | A | 2/1987 | Pozzo et al. | |
| 4,682,308 | A * | 7/1987 | Chung | 367/912 |
| 4,742,499 | A | 5/1988 | Butler | |
| 4,754,441 | A | 6/1988 | Butler | |
| 4,845,688 | A | 7/1989 | Butler | |
| 4,864,548 | A | 9/1989 | Butler | |
| 5,047,683 | A | 9/1991 | Butler et al. | |
| 5,081,391 | A | 1/1992 | Owen | |
| 5,184,332 | A | 2/1993 | Butler | |
| 5,742,561 | A | 4/1998 | Johnson | |
| 6,465,936 | B1 | 10/2002 | Knowles et al. | |
| 6,643,222 | B2 | 11/2003 | Osborn et al. | |
| 6,654,316 | B1 | 11/2003 | Butler et al. | |
| 6,734,604 | B2 | 5/2004 | Butler et al. | |
| 6,950,373 | B2 | 9/2005 | Butler et al. | |
| 2003/0227826 | A1* | 12/2003 | Butler et al. | 367/164 |
| 2007/0195647 | A1* | 8/2007 | Butler et al. | 367/153 |

OTHER PUBLICATIONS

J.L. Butler and S.L. Ehrlich, "Superdirective Spherical Radiator," J. Acoust. Soc. Am., vol. 61, No. 6, Jun. 1977, pp. 1427-1431.
Multimode Directional Telesonar Transducer, Proc. IEEE Oceans, v2, pp. 1289-1292 (2000.).

* cited by examiner

*Primary Examiner*—Dan Pihulic
(74) *Attorney, Agent, or Firm*—David M. Driscoll, Esq.

(57) ABSTRACT

A transduction apparatus, which employs an array of individual transducers that generates multiple acoustic radiation modes, is described. These modes are used together to yield directional steered beam patterns. In one embodiment separate transducers, clustered in the form of a ring array, are used together to generate wide and narrow cardioid type beam patterns through combined monopole, dipole and quadrupole radiation modes in the medium, along with at least one tail mass.

38 Claims, 5 Drawing Sheets

MODAL ACOUSTIC ARRAY TRANSDUCTION APPARATUS

BACKGROUND OF THE INVENTION

1. Field of the Invention

The present invention relates in general to acoustic transducer arrays and also relates to a transducer array capable of radiating steered modal based directional acoustic energy.

2. Background and Discussion

Traditionally arrays of sonar transducer are used to form directional beams that can be electronically steered to various directions. They often take the form of planar, spherical, or cylindrical arrays. U.S. Pat. No. 3,290,646, entitled "Sonar Transducer," by S. L. Ehrlich and P. D. Frelich describes a sonar transducer where beams are formed and steered from a single transducer in the form of a cylinder. Cardioid beam patterns are formed through the combination of extensional monopole and dipole modes of vibration of a piezoelectric tube, cylinder or ring. In the published paper, "Superdirective spherical radiator," J. Acoust. Soc. Am., 61, 1427-1431 (1977) by J. L. Butler and S. L. Ehrlich, a multimodal spherical shell and array is presented as examples of radiators which can achieve super-directivity through a specified addition of spherical radiation modes. In U.S. Pat. No. 6,734,604, entitled "Multimode Synthesized Beam Transduction Apparatus," issued on May 11, 2004, there is described a method for directional beam formation using monopole, dipole and quadrupole mechanical modes of vibration of a continuous piezoelectric tube operating as a unitary transducer with steered beam capabilities.

It is a general object of the present invention to provide a transduction apparatus, which employs an array of individual transducers that generates multiple acoustic radiation modes in the medium which yield a directional steered beam pattern.

Another object of the present invention is to provide an array of transduction elements, which generates multiple radiation modes including the quadrupole mode to obtain an improved, more directional, steered beam pattern.

A further object of the invention is to provide an electromechanical transduction array apparatus having beam patterns with desirable beam width, side lobe and null structural properties as a result of the addition of the quadrupole mode.

Still another object of the present patent is to provide an electromechanical transduction array apparatus characterized by a constant beam pattern and smooth response over a broadband operating range from an array of transducers.

SUMMARY OF THE INVENTION

To accomplish the foregoing and other objects, features and advantages of the invention there is provided an improved electromechanical transducer array apparatus that employs a means for utilizing the transducers in a way which radiates acoustic modes in the medium in a controlled prescribed manner so as to yield a directional beam pattern.

In accordance with the invention there is provided an electromechanical transduction array apparatus that is comprised of multiple acoustic transducers arranged to excite radiation modes which can be combined to obtain an improved directional pattern. The combination can result from a specification of the voltages on the transducers and can yield the same beam pattern with a constant beam width over a broad frequency range.

The transducer array apparatus or system may be constructed of piezoelectric, electrostrictive, single crystal or magnetostrictive material driving radiating pistons and forming an array of elements preferably in the shape of a ring, cylinder or spherical array structure.

In one embodiment of the invention a cylindrical array is comprised of rings of transducers which may include, for example, eight piezoelectric ceramic stacks each driving a piston and each stack in mechanical contact with a common center tail mass. Multiple rings are arranged along the cylindrical axis to increase the output and concentrate the acoustic intensity. The piezoelectric stacks are driven to excite the pistons and cause monopole, dipole and quadrupole radiation modes which, combined together in defined proportions, form the desired constant beam pattern. In another embodiment each of the transducers, comprised of piezoelectric stacks and pistons, have separate tail masses rather than a common center mass.

As a reciprocal device the transducer may be used as a transmitter or a receiver and may be used in a fluid, such as water, or in a gas, such as air.

BRIEF DESCRIPTION OF THE DRAWINGS

Numerous other objectives, features and advantages of the invention should now become apparent upon a reading of the following detailed description taken in conjunction with the accompanying drawings, in which.

DETAILED DESCRIPTION

In this present invention separate transducers are clustered in the form of a ring, cylinder or sphere array and are used together to launch multiple radiation modes in the medium rather than excitation from the modes of vibration of a continuous structure such as a piezoelectric ceramic tube, as in our previous invention.

Figure 1A:
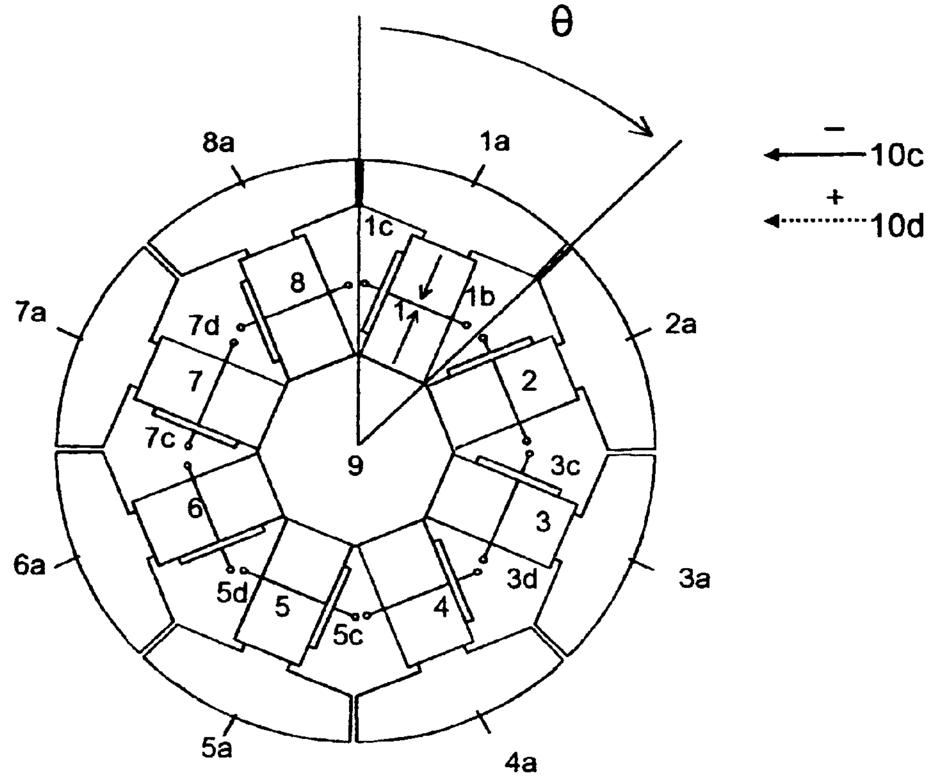
FIG. 1A schematically illustrates a cylinder or ring that includes eight piezoelectric ceramic transducer stacks and pistons with a common tail mass.
Figure 1B:
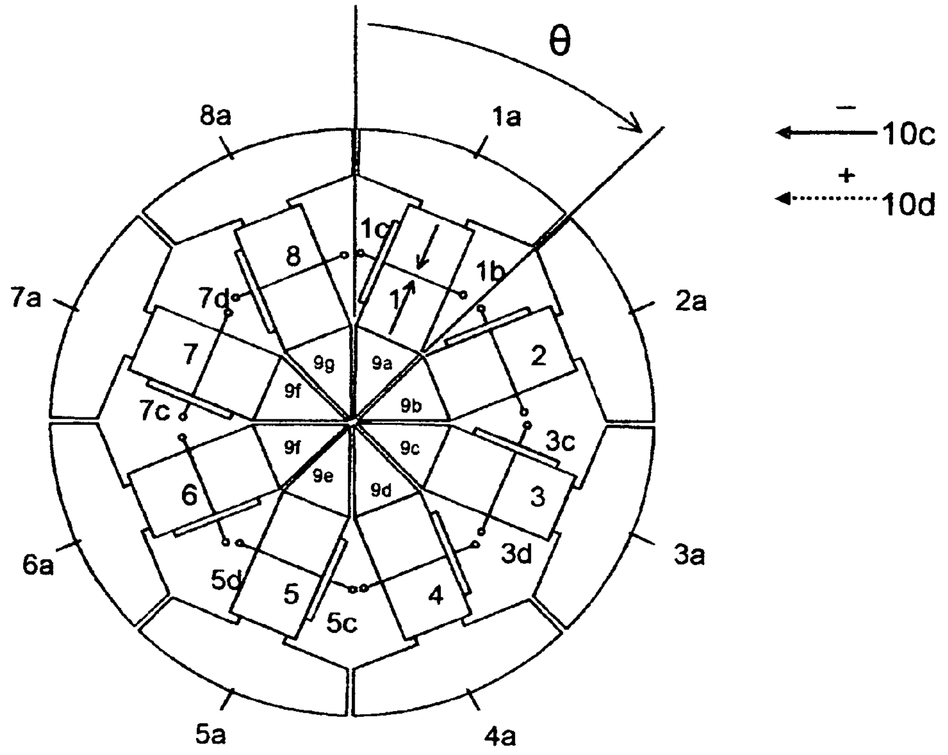
FIG. 1B schematically illustrates a cylinder or ring that includes eight piezoelectric ceramic transducer stacks and pistons with eight individual tail masses.

In accordance with the present invention, there is now described herein embodiments for practicing the invention. Reference is made to FIG. 1A which shows eight piezoelectric stacks, 1,2,3,4,5,6,7,8 respectively driving eight pistons 1*a*,2*a*,3*a*,4*a*,5*a*,6*a*,7*a*,8*a* from a common centrally disposed tail mass 9. FIG. 1B shows eight piezoelectric stacks, 1,2,3,4,5,6,7,8 respectively driving eight pistons 1*a*,2*a*,3*a*, 4*a*,5*a*,6*a*,7*a*,8*a* from eight individual tail masses 9*a*, 9*b*, 9*c*, 9*d*, 9*e*, 9*f*, 9*g* and 9*h*. The piezoelectric ceramic stacks, typically lead zirconate titanate material PZT, are shown for simplicity to be composed of two pieces wired in parallel with electrical connections 1*c* and 1*d*, 2*c* and 2*d*, 3*c* and 3*d*, 4*c* and 4*d*, 5*c* and 5*d*, 6*c* and 6*d*, 7*c* and 7*d*, 8*c* and 8*d*. The direction of polarization is shown by the arrows arranged for additive output. The impedance of the transducer array may be changed by altering the number of piezoelectric pieces wired in parallel.

Figure 2A:
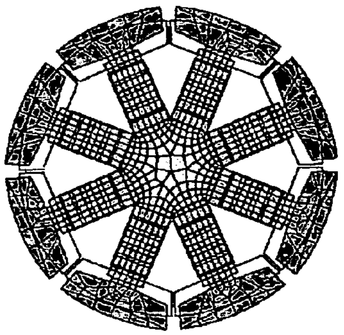
FIGS. 2A, 2B and 2C, respectively illustrate the first three modes of vibration of the transducers of the ring array of FIG. 1, which excite respective monopole, dipole, and quadrupole radiation modes in the medium.

Connection of all wires together 1*c*,2*c*,3*c*,4*c*,5*c*,6*c*,7*c*,8*c* as the negative terminal, 10*c*, and 1*d*,2*d*,3*d*,4*d*,5*d*,6*d*,7*d*,8*d* as the positive terminal, 10*d*, cause all pistons 1*a*,2*a*,3*a*,4*a*, 5*a*,6*a*,7*a*,8*a* to oscillate in phase when driven with an oscillating (AC) electrical voltage. This creates a monopole source with displacement, at an instant of time, shown in FIG. 2A with the resulting beam pattern shown in FIG. 3A with normalized radiating beam pattern function $F(\theta)=1$ where the angle $\theta$ is shown in FIG. 1A. This uniform beam pattern may be extended over a broad range of frequencies up to a frequency where the center to center separation between the pistons is greater than one-half a wavelength in the radiating medium where the beam pattern function is not a constant as a function of angle and displays small cyclic variations in amplitude.

Figure 2B:
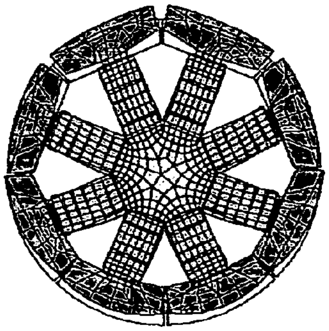

A dipole type mode may be excited by driving the bottom four piezoelectric stacks 3,4,5,6 opposite in phase with the top four modes creating beam pattern nulls in a plane which passes through stacks 2 and 3 as well as stacks 6 and 7. This mode can be adjusted to approximate an ideal dipole mode by reducing the amplitude of the voltage on the piezoelectric stacks 2,3,6,7 to approximately 40% of the drive on stacks 1,4,5,8 and thereby providing an improved approximation of the function cos $\theta$. The corresponding instant displacement is shown in FIG. 2B and the acoustic radiating normalized beam pattern function $F(\theta)=\cos\theta$ is shown in FIG. 3B. High frequency restrictions also apply to this mode.

Figure 2C:
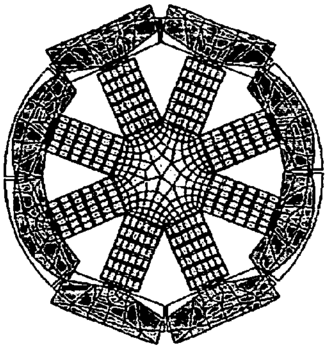

The quadrupole mode may be excited by driving piezoelectric stacks 1,4,5,8 together but out of phase with piezoelectric stacks 2,3,6,7. The corresponding instant displacement is shown in FIG. 2C and the acoustic radiating normalized beam pattern function $F(\theta)=\cos 2\theta$ is shown in FIG. 3C. High frequency restrictions also apply to this mode. Higher order modes, such as the octopole mode may be excited by increasing the number of transducers of the ring.

Figure 4:
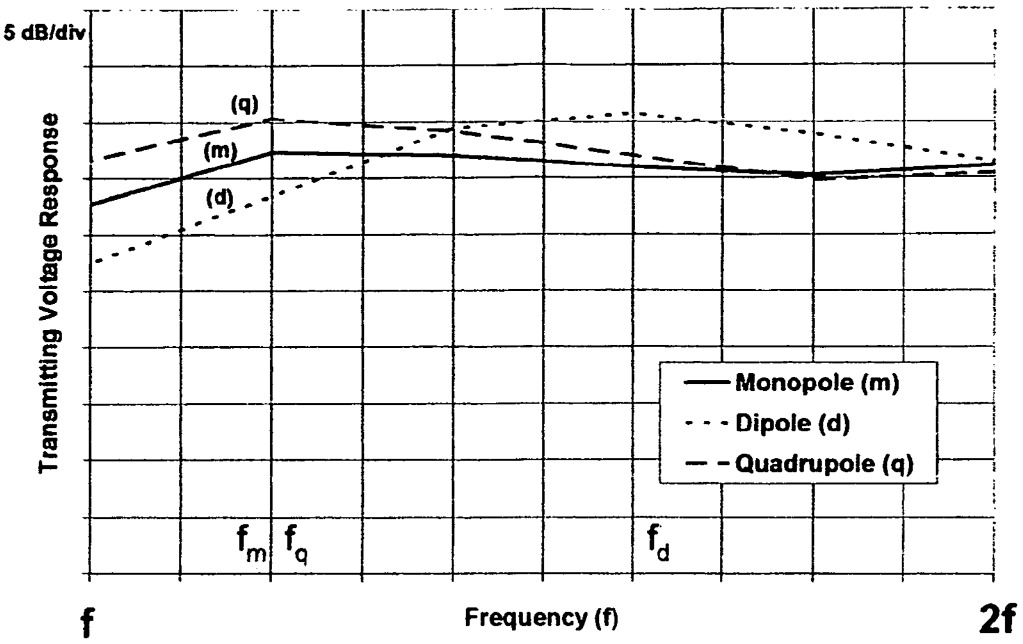
FIG. 4 is a plot of voltage response versus frequency for the monopole (m), dipole (d), and quadrupole (q), transmitting response curves.

FIG. 4 shows the monopole (m), dipole (d), and quadrupole (q), transmitting response curves. The resonant frequencies are $f_m$, $f_d$ and $f_q$ for the monopole, dipole and quadrupole modes respectively. The response of both the dipole and quadrupole modes falls of more rapidly below resonance because of the out of phase cancellation compared to the in phase motion of the monopole mode. The monopole and quadrupole modes produce greater output in the vicinity of resonance than the dipole mode because the common tail mass acts as an infinite tail mass for these symmetric modes producing greater motion of the pistons and nearly the same resonant frequencies.

Figure 3A:
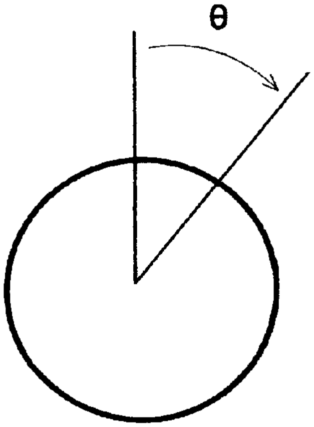
FIGS. 3A, 3B, and 3C show the monopole, dipole, and quadrupole, beam patterns associated respectively with the modes of FIGS. 2A, 2B and 2C.
Figure 3B:
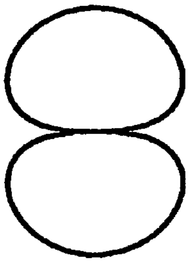
Figure 3C:
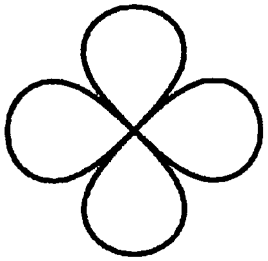
Figure 5:
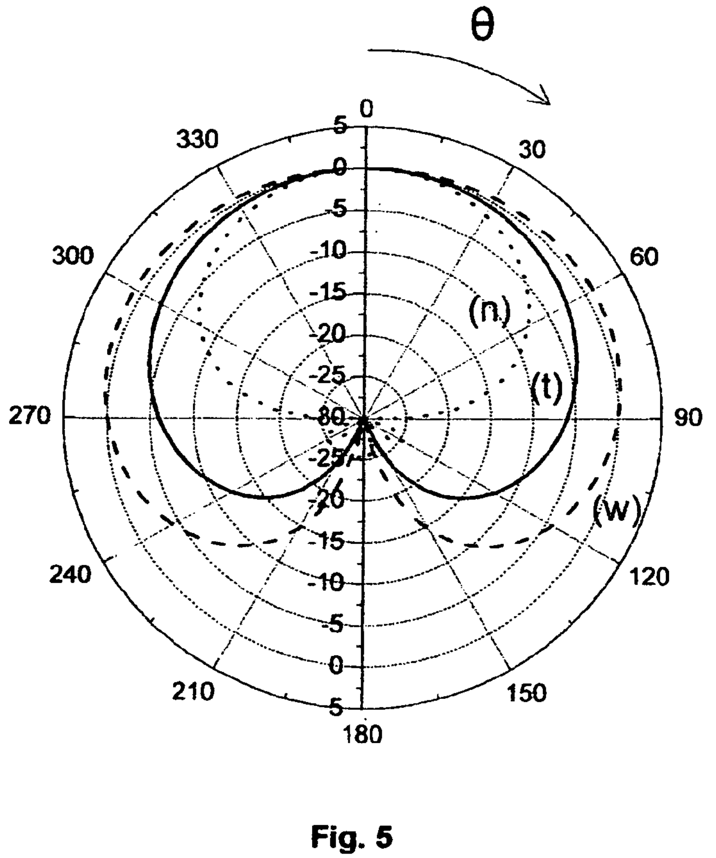
FIG. 5 shows true cardioid (t), narrow cardioid (n), and wide cardioid (w) beam patterns, respectively, generated form the three modes of FIG. 4.

The beam patterns shown in FIGS. 3A, 3B and 3C may be combined together to form various desirable patterns according to the general normalized beam pattern function formula:

$$P(\theta)=[1+A\cos(\theta)+B\cos(2\theta)]/[1+A+B] \quad \text{Eq. (1)}$$

where: 1=monopole weighting factor, A=dipole weighting factor, and B=quadrupole weighting factor The well known classical true cardioid pattern of FIG. 5(*t*) is obtained with A=1 and B=0. The excitation of the quadrupole radiation mode, $|B|>0$, allows optimized narrower or wider beam patterns. The directional narrow cardioid beam pattern of FIG. 5(*n*), with reduced equal level side lobes of approximately −25 dB, is obtained for A=8/5 and B=4/5. This beam may be used in scanning sonar systems. The wide beam cardioid pattern with sharp deep rear null of FIG. 5(*w*) is obtained for A=2/3 and B=−1/3. This beam allows wide beam coverage along with a narrow null for acoustic pressure level reduction in a particular direction of unwanted scattering, in the case of transmitting or, unwanted noise, in the case of receiving. Other beams may be obtained through different weighting function of the respective modes or by addition of higher order modes such as the octopole mode.

Figure 6:
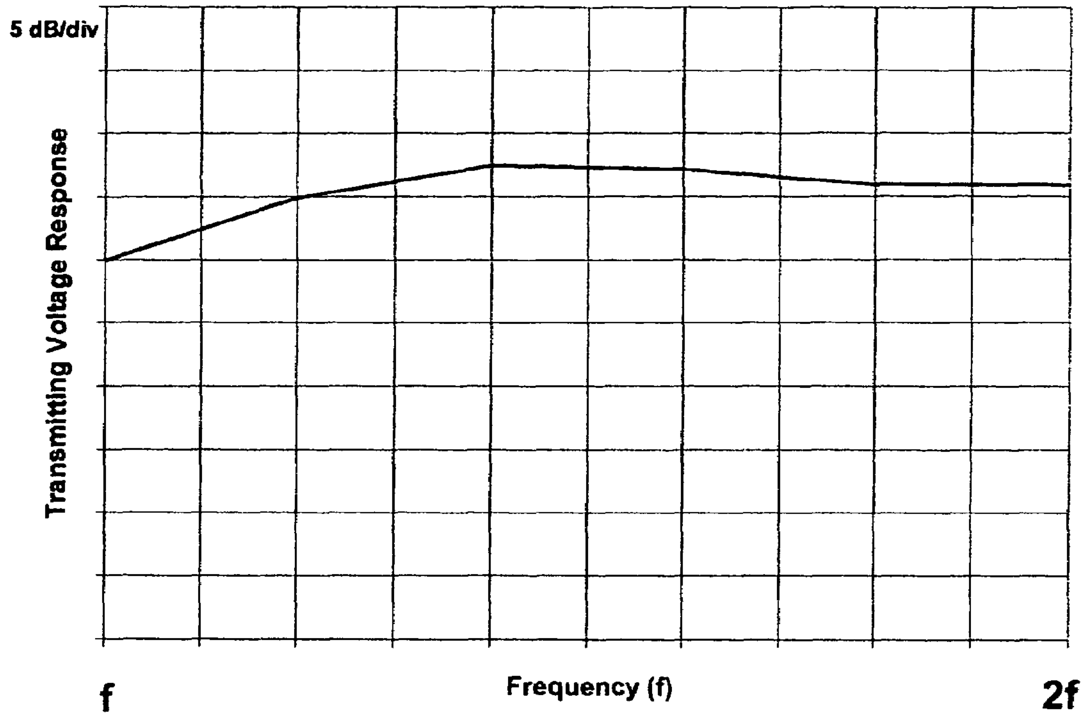
FIG. 6 shows the transmitting response of the combined modes, which produce the narrow cardioid beam pattern (n) of FIG. 5.
Figure 7:
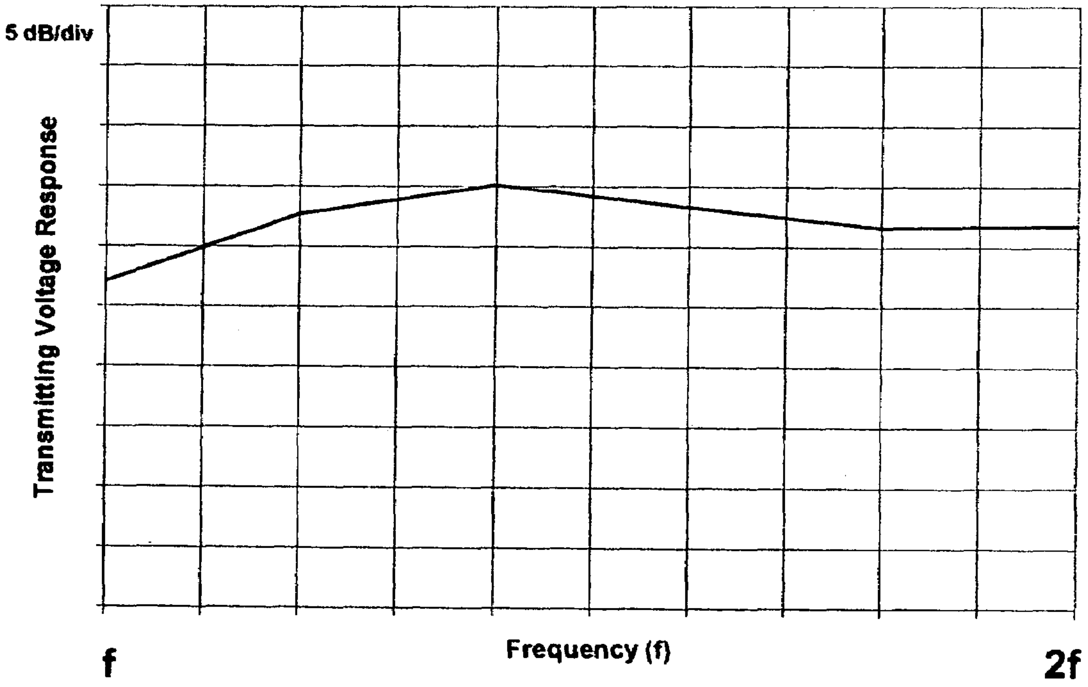
FIG. 7 shows the transmitting response of the combined modes, which produce the wide cardioid beam pattern (w) of FIG. 5.

The transmitting response for each individual mode, separately excited, is shown in FIG. 4 while the transmitting response with the modes simultaneously excited is shown in FIG. 6 for the narrow cardioid pattern of FIG. 5(*n*) while the transmitting response of FIG. 7 for the wide cardioid beam pattern of FIG. 5(*w*). The associated beam patterns of FIGS. 5(*n*) and 5(*w*) may be maintained over a wide frequency band by adjusting the amplitude and phase of the drive voltage, at each frequency, to achieve the same on-axis in-phase acoustic pressure for each mode. This aspect of the invention and the means for achieving it are now more fully explained for the specific case of the narrow cardioid beam of FIG. 5(*n*).

Figure 8:
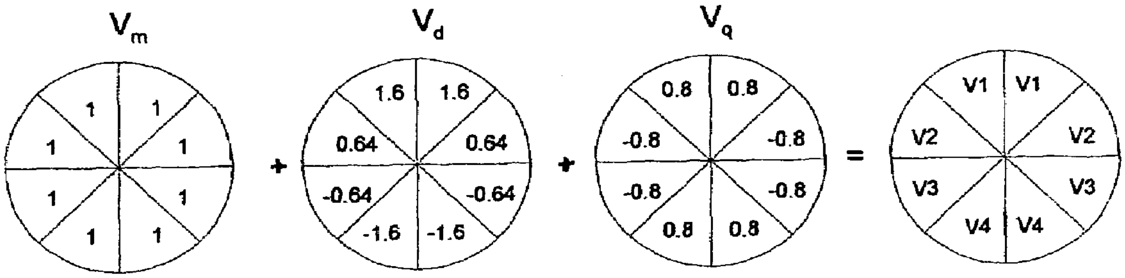
FIG. 8 shows the scheme for modal addition for the beam pattern (n) of FIG. 5.

The voltage distribution for the beam pattern of FIG. 5(*n*) can be obtained through a synthesis of the transmitting response curves of FIG. 4. The input voltages for each of the transmitting responses are first adjusted to yield the same pressure amplitude and phase at each frequency within the band of interest. These voltages for each mode, $V_m$ for monopole, $V_d$ for dipole and $V_q$, for the quadrupole, are then multiplied, respectively, by the weighting factors, 1, A, B for the desired beam pattern according to Eq. (1). The distribution for the narrow cardioid with weighting factors A=8/5=1.6 and B=4/5=0.8 is illustrated in FIG. 8. In this example there is shown the summing of $1.0\times V_m$ volts for the monopole mode, $1.6\times V_d$ volts and, as discussed earlier, $0.4\times1.6\times V_d=0.64\times V_d$ volts for the dipole mode, and $0.8\times V_q$ volts for the quadrupole mode with the resulting summed voltages $V_1$, $V_2$, $V_3$ and $V_4$.

The three-mode synthesis for the symmetrical voltage distribution $V_1$, $V_2$, $V_3$ and $V_4$ of FIG. 8 may be written in an algebraic form as $$V_1=V_m+1.60\ V_d+0.8\ V_q$$

$$V_2=V_m+0.64\ V_d-0.8\ V_q$$

$$V_3=V_m-0.64\ V_d-0.8\ V_q$$

$$V_4=V_m-1.60\ V_d+0.8\ V_q$$

where $V_m$ is the voltage for the monopole radiation mode, $V_d$ is the desired voltage for the dipole radiation mode to bring the acoustic far field pressure to the same amplitude and phase as the monopole mode and $V_q$ is the desired voltage of the quadrupole radiation mode to be bring the acoustic far field pressure to the same amplitude and phase as the monopole mode,—all to achieve the desired narrow cardioid beam pattern of FIG. 5(*n*) and based on Eq. (1). Beam steering is achieved by incrementing the entire voltage distribution by one transducer. A different set of coefficients would be used for different weighting functions and for the first three modes may be generally written as $$V_1=V_m+A\ V_d+B\ V_q$$

$$V_2=V_m+0.4\ A\ V_d-B\ V_q$$

$$V_3=V_m-0.4\ A\ V_d-B\ V_q$$

$$V_4=V_m-A\ V_d+B\ V_q$$

The process may be applied to other geometrical transducer shapes and higher order modes may be used to obtain more directional beam patterns following Eq. (2) below.

The above equation set may be generalized and applied to more than three modes with the beam pattern function written as $$P(\theta)=[\Sigma A_n \cos(n\theta)]/\Sigma A_n \qquad \text{Eq. (2)}$$

where $A_n$ is the weighting coefficient of the $n^{th}$ mode and n=0 corresponds to the monopole mode. With the modal transmitting response $T_n=p_n/v_n$ where $p_n$ is the modal pressure and $v_n$ is the modal voltage we set $A_n=p_n/p_0=T_n v_n/T_0 v_0$ and for a 1 volt monopole voltage one arrives at the transducer modal voltages $v_n=A_n T_0/T_n$ for desired beam pattern weighting factors, $A_n$. Since all modal pressures are now adjusted to be the same or approximately the same over a band of frequencies, the combined beam patterns and the response will also be the same at all frequencies. Also, since Eq. (2) is a Fourier series, the coefficients $A_n$ can be determined for any desired symmetric pattern by a Fourier cosine transform of Eq. (2) and its normalized coefficient may be determined from:

$$A_n/\Sigma A_n=(2/\pi)\int P(\theta)\cos(n\theta)d\theta \qquad \text{Eq. (3)}$$

where the integration is from θ=0 to π. It should be pointed out that although a cosine expansion has been indicated a sine expansion or combination of the two could be used for this process.

The beam patterns and transmitting response curves of FIGS. 2A through FIG. 6 were calculated using a finite element program. A coaxial transducer array, illustrated in FIG. 9, has been fabricated and tested with results that are in good agreement with calculated theoretical and finite element predicted beam patterns and transmitting response. FIG. 7 shows the measured wide beam cardioid response.

Figure 9:
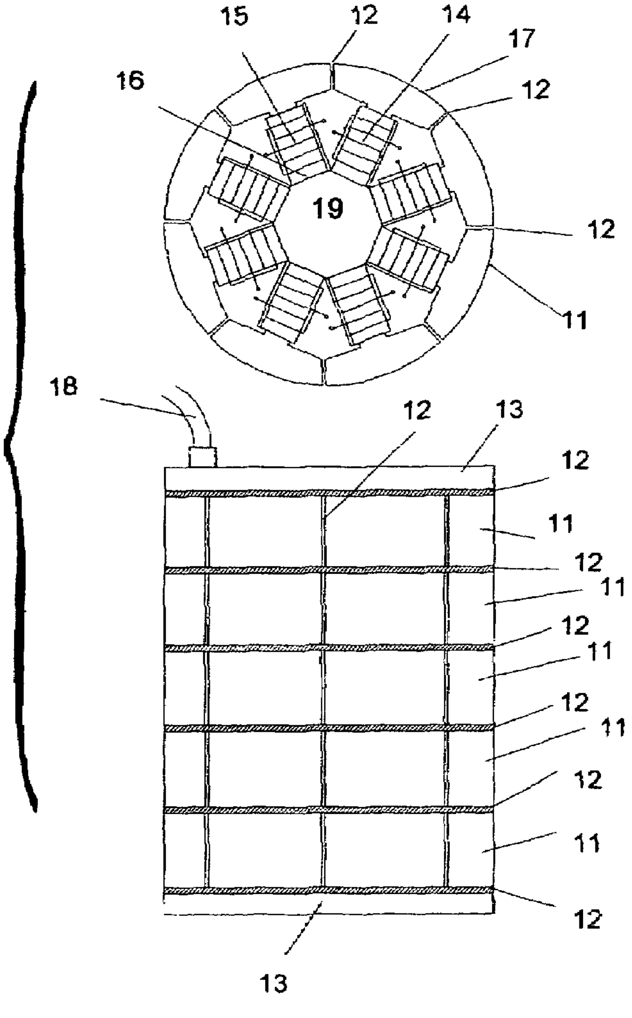
FIG. 9 shows a construction for the transducer with five rings each driven by eight piezoelectric stacks and pistons with six isolation rings, piston isolators and two metal end caps.

A somewhat schematic drawing of the five ring transducer array is shown in FIG. 9. The five transducer array rings 11 may be 1.5 inches high each with a total array height of approximately nine inches, including the isolation gaps 12, and end caps 13. The diameter of the array may be six inches and, although not shown, is encapsulated in polyurethane to prevent water ingression and to electrically insulate the transducer. The cable 18 includes 8 wires plus a ground for connections to the eight transducer staves each composed of five piezoelectric ceramic PZT stacks 14, with eight connecting wires, 15, and a common ground, 16. The eight piezoelectric stacks of each ring are sandwiched between eight aluminum pistons 17 and a common centrally disposed steel tail mass 19. Each piezoelectric stack may be composed of six piezoelectric plates all wired for additive output. A compression bolt, not shown, compresses the piezoelectric stacks for high power operation. The unit has been tested over an octave band and was found to yield the desired predicted results for monopole, dipole and quadrupole beams and the narrow and wide cardioid beams and corresponding frequency responses.

The following patents are also incorporated by reference, in their entirety, herein: U.S. Pat. No. 6,734,604 B2, "Multimode Synthesized Beam Transduction Apparatus", May 11, 2004; U.S. Pat. No. 6,950,373 B2, "Multiply Resonant Wideband Transducer Apparatus," Sep. 27, 2005; U.S. Pat. No. 6,654,316 B1, "Single-Sided Electro-Mechanical Transduction Apparatus, Nov. 25, 2003; U.S. Pat. No. 3,378,814 "Directional Transducer," Apr. 16, 1968; U.S. Pat. No. 4,326,275 "Directional Transducer" Apr. 20, 1982; U.S. Pat. No. 4,443,731 "Hybrid Piezoelectric Magnetostrictive Transducer," Apr. 17, 1996; U.S. Pat. No. 4,438,509 "Transducer with Tensioned Wire Precompression," Mar. 20, 1984; U.S. Pat. No. 4,642,802 "Elimination of Magnetic Biasing," Feb. 20, 1987; U.S. Pat. No. 4,742,499 "Flextensional Transducer," Mar. 3, 1988; U.S. Pat. No. 4,754,441 "Directional Flextensional Transducer," Jun. 28, 1988; U.S. Pat. No. 4,845,688 "Electro-Mechanical Transduction Apparatus," Jul. 4 ,1989; U.S. Pat. No. 4,864,548 "Flextensional Transducer," Sep. 5, 1989; U.S. Pat. No. 5,047,683 "Hybrid Transducer," Sep. 10, 1991; U.S. Pat. No. 5,184,332 "Multiport Underwater Sound Transducer," Feb. 2, 1993; U.S. Pat. No. 3,290,646, "Sonar Transducer," by S. L. Ehrlich and P. D. Frelich; and U.S. Pat. No. 3,732,535 to S. L. Ehrlich.

Having now described a limited number of embodiments of the present invention, it should now become apparent to those skilled in the art that numerous other embodiments and modifications thereof are contemplated as falling within the scope of the present invention as defined in the appended claims. Mention has been made of the transducer being air-filled, however, in an alternate embodiment of the invention the transducer may be water-filled for free flooded operation. Although the embodiment described use eight transducers, the monopole, dipole and quadrupole modes can be excited by as few as four transducers and with greater precision by a number higher than eight. Also, modes higher than the quadrupole or octopole modes can be readily generated with a larger number of transducers providing narrower beam patterns.

What is claimed is:

1. An electro-acoustical transduction array for providing a directional acoustic beam pattern and comprised of at least four electro-mechanical transducers, means for separately exciting predetermined ones of said transducers to provide a combined launch of at least the monopole, dipole and quadrupole radiation modes, providing a directional incrementally steered beam by means of a predetermined voltage distribution that selectively controls said transducers, and at least one tail mass common to all transducers.

2. An electro-acoustic transduction array apparatus set forth in claim 1 wherein the array is electrically driven to attain in-phase pressure addition in the far field.

3. An electro-acoustical transduction array apparatus as set forth in claim 1 wherein said transducers are disposed in a radial array emanating from a center and said tail mass includes one of a single mass disposed at the center and multiple tail masses disposed at the center and each associated respectively with one of said at least four transducers.

4. An electro-acoustical transduction array apparatus as set forth in claim 1 wherein the amplitude of the voltage drive is adjusted to achieve various beam patterns and the voltage distribution is determined by the beam pattern formula $$P(\theta)=[\Sigma A_n \cos(n\theta)]/\Sigma A_n$$

where $A_n$ is the weighting coefficient of the $n^{th}$ mode and n=0 corresponds to the monopole mode.

5. An electro-acoustic transduction array apparatus as set forth in claim 4 wherein the generated beam is steered by incrementing the voltage distribution by one or more transducers.

6. An electro-acoustical transduction array apparatus as set forth in claim 4 wherein the array is water-filled for free flooded operation.

7. An electro-acoustical transduction array apparatus as set forth in claim 1 wherein the monopole, dipole, and quadrupole modes each have corresponding resonant frequencies and the voltage distribution is determined by the beam pattern formula $$P(\theta)=[1+A \cos(\theta)+B \cos(2\theta)]/[1+A+B]$$

where: 1=monopole weighting factor, A=dipole weighting factor, and B=quadrupole weighting factor.

8. An electro-acoustical transduction array apparatus as set forth in claim 1 wherein a separate voltage distribution is used for each frequency within the band and is formed by a summing of all modes.

9. An electro-mechanical transduction apparatus as set forth in claim 1 wherein the transducers are of at least one of piezoelectric ceramic, electrostrictive, single crystal, magnetostrictive transduction material.

10. An electro-mechanical transduction apparatus as set forth in claim 1 wherein the array shape is in the form of a ring, cylinder, oval, sphere or spheroid.

11. An electro-acoustical transduction array apparatus as set forth in claim 1 which generates a narrow cardioid type beam pattern with unity monopole weighting, approximately 8/5 dipole weighting and approximately 4/5 quadrupole weighting.

12. An electro-acoustical transduction array apparatus as set forth in claim 1 which generates a wide cardioid type beam pattern with unity monopole weighting, approximately 2/3 dipole weighting and approximately—1/3 quadrupole weighting.

13. An electro-acoustical transduction array apparatus as set forth in claim 1 wherein said transducers are disposed in a ring array which uses eight transducers with individual electromechanical drivers, radiating pistons and tail masses.

14. An electro-acoustical transduction array apparatus as set forth in claim 1 wherein said transducers are disposed in a ring array which uses eight transducers with individual electromechanical drivers, radiating pistons and a common tail mass.

15. An electro-acoustical transduction array apparatus as set forth in claims 13 or 14 which generates a narrow cardioid type beam pattern with unity monopole weighting, approximately 8/5 dipole weighting and approximately 4/5 quadrupole weighting.

16. An electro-acoustical transduction array apparatus as set forth in claims 13 or 14 which generates a wide cardioid type beam pattern with unity monopole weighting, approximately 2/3 dipole weighting and approximately—1/3 quadrupole weighting.

17. An electro-mechanical transduction apparatus as set forth in claims 13 or 14 wherein the ring is operated in water but air backed and caped on its ends.

18. An electro-mechanical transduction apparatus as set forth in claims 13 or 14 wherein an extended array is comprised of multiple coaxial rings operated in water but air backed and caped on its ends.

19. An electro-mechanical transduction apparatus as set forth in claims 1, 13 or 14 wherein the radiation load is a fluid or gas.

20. An electro-mechanical transduction apparatus as set forth in claim 13 or 14 wherein the transducers are at least one of piezoelectric, electrostrictive, single crystal, magnetostrictive, transduction material.

21. An electro-acoustical transduction array apparatus as set forth in claim 1 in a ring array arrangement which uses eight or more transducers with individual electromechanical drivers, radiating pistons and a common or individual tail masses which uses combined monopole, dipole, quadrupole and higher order radiation modes to obtain a highly directional beam pattern that may be incrementally steered.

22. An acoustic array transduction apparatus for providing a directional acoustic beam pattern comprising: an array of a plurality of electro-mechanical transducers, means for exciting at least the first three modes of said plurality of transducers to provide for the combined launch of all of the monopole, dipole and quadrupole radiation modes; said array disposed in a radial pattern so as to provide a directional beam controlled from a predetermined voltage distribution that selectively controls said transducers, and at least one centrally disposed tail mass.

23. An acoustic array transduction apparatus as set forth in claim 22 including a plurality of pistons, like in number to the number of transducers and arranged, respectively, outside of said transducers.

24. An acoustic array transduction apparatus as set forth in claim 23 including at least four transducers.

25. An acoustic array transduction apparatus as set forth in claim 23 including at least eight transducers.

26. An acoustic array transduction apparatus as set forth in claim 22 including a plurality of tail masses like in number to the number of transducers and arranged, respectively, inside of said transducers.

27. A method of forming a directional incrementally steered acoustic beam pattern comprising providing an electro-acoustical transduction array of at least four radially arranged transducers and exciting at least the first three modes of said plurality of transducers to establish all of the monopole, dipole and quadrupole radiation modes by means of a predetermined voltage distribution to said transducers that selectively controls said transducers.

28. A method as set forth in claim 27 wherein the voltage distribution is determined by the beam pattern formula $$P(\theta)=[1+A \cos(\theta)+B \cos(2\theta)]/[1+A+B]$$

where: 1=monopole weighting factor, A=dipole weighting factor, and B=quadrupole weighting factor.

29. A method as set forth in claim 27 wherein the voltage distribution is determined by the beam pattern formula $$P(\theta)=[\Sigma A_n \cos(n\theta)]/\Sigma A_n$$

where $A_n$ is the weighting coefficient of the $n^{th}$ mode and n=0 corresponds to the monopole mode.

30. An acoustic array transduction apparatus as set forth in claim 22 wherein the voltage distribution is determined by the beam pattern formula $$P(\theta)=[1+A \cos(\theta)+B \cos(2\theta)]/[1+A+B]$$

where: 1=monopole weighting factor, A=dipole weighting factor, and B=quadrupole weighting factor.

31. An acoustic array transduction apparatus as set forth in claim 22 wherein the voltage distribution is determined by the beam pattern formula $$P(\theta)=[\Sigma A_n \cos(n\theta)]/\Sigma A_n$$

where $A_n$ is the weighting coefficient of the $n^{th}$ mode and n=0 corresponds to the monopole mode.

32. An electro-acoustic transduction array comprising one of a common tail mass and multiple tail masses, at least four transducers and associated radiating pistons, means for separately exciting predetermined ones of said transducers for the combined and simultaneous excitation and launch of at least the monopole, dipole and quadrupole radiation modes, each mode having a prescribed weighting factor so as to provide a directional beam pattern controlled by means of a discrete voltage distribution on each transducer and determined by the weighting factors for the respective radiation modes.

33. An electro-acoustical transduction array apparatus as set forth in claim 32 wherein said transducers are disposed in a radial array emanating from a center and said tail mass includes one of a single mass disposed at the center and multiple tail masses disposed at the center and each associated respectively with one of said at least four transducers.

34. An electro-acoustical transduction array apparatus as set forth in claim 32 wherein the amplitude of the voltage drive is adjusted to achieve various beam patterns and the voltage distribution is determined by the beam pattern formula $$P(\theta)=[\Sigma A_n \cos(n\theta)]/\Sigma A_n$$

where $A_n$ is the weighting coefficient of the $n^{th}$ mode and n=0 corresponds to the monopole mode.

35. An electro-acoustical transduction array apparatus as set forth in claim 32 wherein the monopole, dipole, and quadrupole modes each have corresponding resonant frequencies and the voltage distribution is determined by the beam pattern formula $$P(\theta)=[1+A\cos(\theta)+B\cos(2\theta)]/[1+A+B]$$

where: 1=monopole weighting factor, A=dipole weighting factor, and B=quadrupole weighting factor.

36. An electro-acoustical transduction array apparatus as set forth in claim 32 wherein a separate voltage distribution is used for each frequency within the band and is formed by a summing of all modes.

37. An electro-acoustical transduction array apparatus as set forth in claim 32 which generates a narrow cardioid type beam pattern with unity monopole weighting, approximately 8/5 dipole weighting and approximately 4/5 quadrupole weighting.

38. An electro-acoustical transduction array apparatus as set forth in claim 32 which generates a wide cardioid type beam pattern with unity monopole weighting, approximately 2/3 dipole weighting and approximately—1/3 quadrupole weighting.

* * * * *